(12) United States Patent
You et al.

(10) Patent No.: US 10,664,578 B2
(45) Date of Patent: May 26, 2020

(54) SECURITY INFORMATION INPUTTING/OUTPUTTING METHOD AND ELECTRONIC DEVICE ADAPTED TO THE METHOD

(71) Applicant: Samsung Electronics Co., Ltd., Gyeonggi-do (KR)

(72) Inventors: Heejun You, Gyeonggi-do (KR); Taeho Kim, Seoul (KR); Hyungjoon Kim, Gyeonggi-do (KR); Seulhan Park, Gyeonggi-do (KR); Jonghoon Park, Gyeonggi-do (KR); Teain An, Gyeonggi-do (KR); Yangsoo Lee, Gyeonggi-do (KR); Moonsu Chang, Gyeonggi-do (KR); Jinho Hyeon, Gyeonggi-do (KR); Seunghwan Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 248 days.

(21) Appl. No.: 14/615,953

(22) Filed: Feb. 6, 2015

(65) Prior Publication Data
US 2015/0234757 A1    Aug. 20, 2015

(30) Foreign Application Priority Data
Feb. 19, 2014 (KR) .................. 10-2014-0019186

(51) Int. Cl.
*G06F 21/32* (2013.01)
*G06F 21/60* (2013.01)
*G06F 21/83* (2013.01)

(52) U.S. Cl.
CPC .......... *G06F 21/32* (2013.01); *G06F 21/604* (2013.01); *G06F 21/83* (2013.01); *G06F 2221/031* (2013.01)

(58) Field of Classification Search
CPC .................. G06F 21/32; G06F 2203/0336
USPC .......... 710/267; 382/118, 124, 116, 115, 117
See application file for complete search history.

(56) References Cited

U.S. PATENT DOCUMENTS

| | | | |
|---|---|---|---|
| 6,819,219 B1 * | 11/2004 | Bolle | G07C 9/257 340/5.52 |
| 7,831,070 B1 * | 11/2010 | Cheng | G06K 9/00013 382/124 |
| 8,395,500 B1 * | 3/2013 | Dent | G08B 13/1609 340/540 |
| 9,218,474 B1 * | 12/2015 | Roth | G06F 21/32 |

(Continued)

FOREIGN PATENT DOCUMENTS

| KR | 1020110057449 | 6/2011 |
|---|---|---|
| KR | 101301202 | 9/2013 |

OTHER PUBLICATIONS

Ge et al., "SPROBES: Enforcing Kernel Code Integrity on the TrustZone Architecture", Jul. 15, 2004, The Pennsylvania State University, pp. 1-2.*

*Primary Examiner* — Faisal M Zaman
(74) *Attorney, Agent, or Firm* — The Farrell Law Firm, P.C.

(57) ABSTRACT

A method is provided that inputs/outputs security information to/from an electronic device. The security information inputting method includes sensing a motion for inputting security information by a sensor module; creating an interrupt according to the security information inputting motion; and reading the security information by a security information inputting module, in response to the interrupt.

16 Claims, 8 Drawing Sheets

(56) References Cited

U.S. PATENT DOCUMENTS

| | | | |
|---|---|---|---|
| 9,294,452 B1* | 3/2016 | Jakobsson | H04L 63/08 |
| 2002/0062291 A1* | 5/2002 | Zoka | G06Q 20/382 |
| | | | 705/64 |
| 2002/0073340 A1* | 6/2002 | Mambakkam | G06F 21/32 |
| | | | 726/2 |
| 2003/0052768 A1* | 3/2003 | Maune | G07C 9/00079 |
| | | | 340/5.53 |
| 2004/0015705 A1* | 1/2004 | Guerin | G06F 21/32 |
| | | | 713/186 |
| 2004/0020984 A1* | 2/2004 | Clark | G06Q 20/18 |
| | | | 235/382 |
| 2004/0123113 A1* | 6/2004 | Mathiassen | G06F 21/32 |
| | | | 713/185 |
| 2004/0135801 A1* | 7/2004 | Thompson | G06Q 20/206 |
| | | | 715/702 |
| 2004/0228507 A1* | 11/2004 | Es | G06K 9/00006 |
| | | | 382/124 |
| 2005/0137977 A1* | 6/2005 | Wankmueller | G06Q 20/102 |
| | | | 705/40 |
| 2005/0254689 A1* | 11/2005 | Bouillon | G07C 9/00087 |
| | | | 382/115 |
| 2006/0129838 A1* | 6/2006 | Chen | G06F 21/32 |
| | | | 713/186 |
| 2007/0096870 A1* | 5/2007 | Fisher | G07C 9/00896 |
| | | | 340/5.53 |
| 2008/0030301 A1* | 2/2008 | Terao | B60R 25/04 |
| | | | 340/5.53 |
| 2008/0155268 A1* | 6/2008 | Jazayeri | G06F 21/32 |
| | | | 713/186 |
| 2008/0261560 A1* | 10/2008 | Ruckart | G07C 9/00103 |
| | | | 455/411 |
| 2009/0249079 A1* | 10/2009 | Suzuki | G06F 21/32 |
| | | | 713/186 |
| 2010/0066493 A1* | 3/2010 | Rachlin | G06F 21/32 |
| | | | 340/5.82 |
| 2010/0230486 A1* | 9/2010 | Smith | G06Q 20/1085 |
| | | | 235/379 |
| 2010/0332392 A1* | 12/2010 | Ueno | G06Q 20/0658 |
| | | | 705/44 |
| 2011/0047605 A1* | 2/2011 | Sontag | G06F 21/32 |
| | | | 726/7 |
| 2011/0093703 A1* | 4/2011 | Etchegoyen | G06F 21/57 |
| | | | 713/168 |
| 2011/0123072 A1 | 5/2011 | Moon et al. | |
| 2011/0126280 A1* | 5/2011 | Asano | G06F 21/32 |
| | | | 726/19 |
| 2011/0153497 A1* | 6/2011 | Determan | G06F 21/32 |
| | | | 705/44 |
| 2011/0231667 A1* | 9/2011 | Kindarji | G06K 9/00885 |
| | | | 713/186 |
| 2012/0054741 A1* | 3/2012 | Ali | H04L 9/3231 |
| | | | 718/1 |
| 2012/0174193 A1* | 7/2012 | Dietrich | G06F 21/33 |
| | | | 726/4 |
| 2012/0185698 A1* | 7/2012 | Fiske | G06F 21/32 |
| | | | 713/186 |
| 2012/0298747 A1* | 11/2012 | Mestre | G06Q 20/354 |
| | | | 235/380 |
| 2013/0194070 A1* | 8/2013 | Vemireddy | G06F 21/36 |
| | | | 340/5.81 |
| 2013/0345530 A1* | 12/2013 | McRoberts | A61B 5/0022 |
| | | | 600/323 |
| 2014/0068726 A1* | 3/2014 | Jakobsson | G06F 21/31 |
| | | | 726/5 |
| 2014/0095918 A1* | 4/2014 | Stahl | G06F 21/725 |
| | | | 713/500 |
| 2014/0109197 A1* | 4/2014 | Schneider | G06F 8/61 |
| | | | 726/4 |
| 2014/0115718 A1* | 4/2014 | Kellerman | G06F 21/60 |
| | | | 726/27 |
| 2014/0282945 A1* | 9/2014 | Smith | G06F 21/32 |
| | | | 726/6 |
| 2015/0067786 A1* | 3/2015 | Fiske | H04L 63/08 |
| | | | 726/4 |
| 2015/0121068 A1* | 4/2015 | Lindemann | H04L 63/0823 |
| | | | 713/158 |
| 2015/0237046 A1* | 8/2015 | Chang | H04L 63/0861 |
| | | | 726/7 |
| 2016/0125180 A1* | 5/2016 | Smith | G06F 21/34 |
| | | | 726/20 |
| 2016/0127351 A1* | 5/2016 | Smith | G06F 21/316 |
| | | | 726/10 |
| 2016/0171289 A1* | 6/2016 | Lee | G06F 3/14 |
| | | | 382/118 |
| 2016/0330172 A1* | 11/2016 | Muttik | H04L 63/0281 |
| 2017/0039368 A1* | 2/2017 | Grobman | G06F 21/31 |

* cited by examiner

SECURITY INFORMATION INPUTTING/OUTPUTTING METHOD AND ELECTRONIC DEVICE ADAPTED TO THE METHOD

PRIORITY

This application claims priority under 35 U.S.C. § 119(a) to a Korean Patent Application filed on Feb. 19, 2014 in the Korean Intellectual Property Office and assigned Serial No. 10-2014-0019186, the entire disclosure of which is incorporated herein by reference.

BACKGROUND OF THE INVENTION

1. Field of the Invention

The present invention relates to a security information inputting/outputting method and an electronic device adapted to the method.

2. Description of the Related Art

Electronic devices have recently been developed in the form of mobile devices, such as smart phones, etc., and are equipped with a variety of applications to provide corresponding services. If an application is executed in an electronic device, it may require a relatively high level of security. A user's biometric information is becoming an approach for securing electronic devices. Examples of biometric information are fingerprint, voice, face, iris, the lines of the palm, vein patterns, etc.

Conventional security information processing systems have read a user's security information not in secure world but in normal world. Therefore, they have been disadvantageous because raw data of a user's security information may be stolen and disclosed by someone with malicious intent before the raw data is encrypted in a security information processing module.

SUMMARY OF THE INVENTION

The present invention has been made to address at least the above problems and disadvantages, and provides at least the advantages described below, Accordingly, an aspect of the present invention provides a method that reads a user's security information and processes it in secure world until the raw data of the security information is encrypted in a security information processing module, thereby preventing the raw data from being disclosed from the time point of reading the security information.

Another aspect of the present invention provides a method that processes a user's security information in secure world through a buffer and outputs it, thereby preventing the security information from being disclosed.

Another aspect of the present invention provides a method that can securely input and output a user's security information and an electronic device adapted to the methods.

In accordance with an aspect of the present invention, a method for inputting security information to an electronic device includes sensing a motion for inputting security information by a sensor module; creating an interrupt according to the security information inputting motion; and reading the security information by a security information inputting module, in response to the interrupt.

In accordance with another aspect of the present invention, an electronic device includes a sensor module; and a processor. The processor senses a motion for inputting security information by the sensor module, creates an interrupt according to the security information inputting motion, and reads the security information by a security information inputting module in response to the interrupt.

In accordance with another aspect of the present invention, a computer-readable recoding medium having a program recorded thereon is provided, which when executed, performs a method including sensing a motion for inputting security information by a sensor module; creating an interrupt according to the security information inputting motion; and reading the security information by a security information inputting module, in response to the interrupt.

BRIEF DESCRIPTION OF THE DRAWINGS

The above aspects, features and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
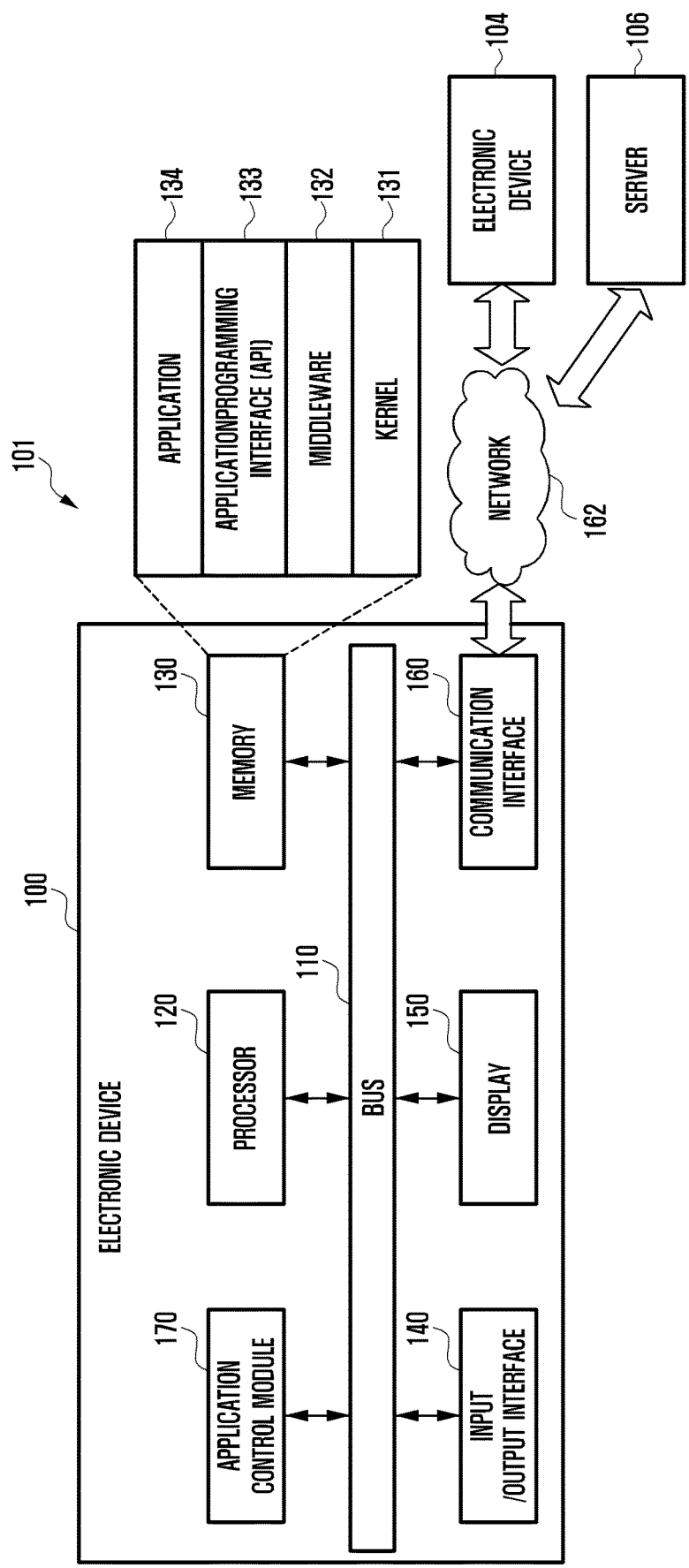
FIG. 1 is a block diagram illustrating a network environment including therein an electronic device in accordance with an embodiment of the present invention.

Hereinafter, embodiments of the present invention are described in detail with reference to the accompanying drawings. While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated. The same reference numbers are used throughout the drawings to refer to the same or like parts.

The expression "comprising" or "may comprise" used in the present disclosure indicates presence of a corresponding function, operation, or element and does not limit an additional at least one function, operation, or element. Further, in the present disclosure, the term "comprise" or "have" indicates presence of a characteristic, numeral, step, operation, element, component, or combination thereof described herein and does not exclude the presence or addition of at least one other characteristic, numeral, step, operation, element, component, or combination thereof.

In the present disclosure, the expression "or" includes any combination or the entire combination of together listed words. For example, "A or B" may include A, B, or A and B.

The expression "first" and "second" in the present disclosure may represent various elements of the present invention, but do not limit corresponding elements. For example, the expression does not limit the order and/or importance of corresponding elements. The expression may be used for distinguishing one element from another element. For example, both a first user device and a second user device are user devices and represent different user devices. For example, a first constituent element may be referred to as a second constituent element without deviating from the scope of the present invention, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate the embodiments. When used in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of ordinary skill in the art. Generally used terms defined in a dictionary have a meaning corresponding to that of a context of related technology and do not have an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are merely examples and are not to be considered as a limitation of the invention.

FIG. 1 is a block diagram illustrating a network environment 101 including therein an electronic device 100 in accordance with an embodiment of the present invention. Referring to FIG. 1, the electronic device 100 includes, but is not limited to, a bus 110, a processor 120, a memory 130, an input/output interface 140, a display 150, a communication interface 160, and an application control module 170.

The bus 110 may be a circuit designed for connecting the above-discussed elements and communicating data (e.g., a control message) between such elements.

The processor 120 receives commands from the other elements (e.g., the memory 130, the input/output interface 140, the display 150, the communication interface 160, or the application control module 170, etc.) through the bus 110, interprets the received commands, and performs the arithmetic or data processing based on the interpreted commands.

The memory 130 stores therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 controls or manages system resources (e.g., the bus 110, the processor 120, or the memory 130, etc.) used for performing operations or functions of the other programming modules, e.g., the middleware 132, the API 133, or the application 134. Additionally, the kernel 131 may provide an interface that allows the middleware 132, the API 133 or the application 134 to access, control or manage individual elements of the electronic device 100.

The middleware 132 performs intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using techniques such as assigning the priority for using a system resource of the electronic device 100 (e.g., the bus 110, the processor 120, or the memory 130, etc.) to at least one of the applications 134.

The API 133 is an interface for allowing the application 134 to control a function provided by the kernel 131 or the middleware 132 and may include, for example, at least one interface or function (e.g., a command) for a file control, a window control, an image processing, a text control, and the like.

According to an embodiment of the present invention, the application 134 may include an SMS/MMS application, an email application, a calendar application, an alarm application, a health care application (e.g., an application for measuring quantity of motion or blood sugar), an environment information application (e.g., an application for providing information about atmospheric pressure, humidity, or temperature, etc.), and the like. Additionally or alternatively, the application 134 may be an application associated with an exchange of information between the electronic device 100 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 100 (e.g., the SMS/MMS application, the email application, the health care application, or the environment information application, etc.) to an external electronic device (e.g., an electronic device 104). Additionally or alternatively, the notification relay application may receive notification information from the external electronic device 104 and provide it to a user. The device management application may manage (e.g., install, remove or update) a certain function (a turn-on/turn-off of an external electronic device (or some components thereof), or an adjustment of brightness (or resolution) of a display) of any external electronic device 104 communicating with the electronic device 100, a certain application operating at such an external electronic device, or a certain service (e.g., a call service or a message service) provided by such an external electronic device.

According to an embodiment of the present invention, the application 134 may include an application specified depending on attributes (e.g., a type) of an external electronic device 104. For example, when external electronic device 104 is an MP3 player, the application 134 may include a specific application associated with a play of music. Similarly, when external electronic device 104 is a portable medical device, the application 134 may include a specific application associated with a health care. In an embodiment of the present invention, the application 134 may include at least one of an application assigned to the electronic device 100 or an application received from an external electronic device (e.g., the server 106 or the electronic device 104).

The input/output interface 140 delivers commands or data, entered by a user through an input/output unit (e.g., a sensor, a keyboard, or a touch screen), to the processor 120, the memory 130, the communication interface 160, or the application control module 170 via the bus 110. For example, the input/output interface 140 may provide data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 displays thereon various kinds of information (e.g., multimedia data, text data, etc.) to a user.

The communication interface 160 performs a communication between the electronic device 100 and any external electronic device (e.g., the electronic device 104 of the server 106). For example, the communication interface 160 may communicate with any external device by being connected with a network 162 through a wired or wireless communication. A wireless communication includes, but is not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication includes, but is not limited to, at least one of USB (Universal Serial Bus), HDMI (High Definition Multimedia Interface), RS-232 (Recommended Standard 232), or POTS (Plain Old Telephone Service).

The network 162 may be a communication network, which includes at least one of a computer network, an internet, an internet of things, or a telephone network. According to an embodiment of the present invention, a protocol (e.g., transport layer protocol, data link layer protocol, or physical layer protocol) for a communication between the electronic device 100 and any external device may be supported by at least one of the application 134, the API 133, the middleware 132, the kernel 131, or the communication interface 160.

The application control module 170 processes at least part of information obtained from the other elements (e.g., the processor 120, the memory 130, the input/output interface 140, or the communication interface 160, etc.) and then provides it to a user in various ways. For example, the application control module 170 may recognize information about access components equipped in the electronic device 100, store such information in the memory 130, and execute the application 134 on the basis of such information. A further description about the application control module 170 will be given below with reference to FIGS. 2 to 9.

Figure 2:
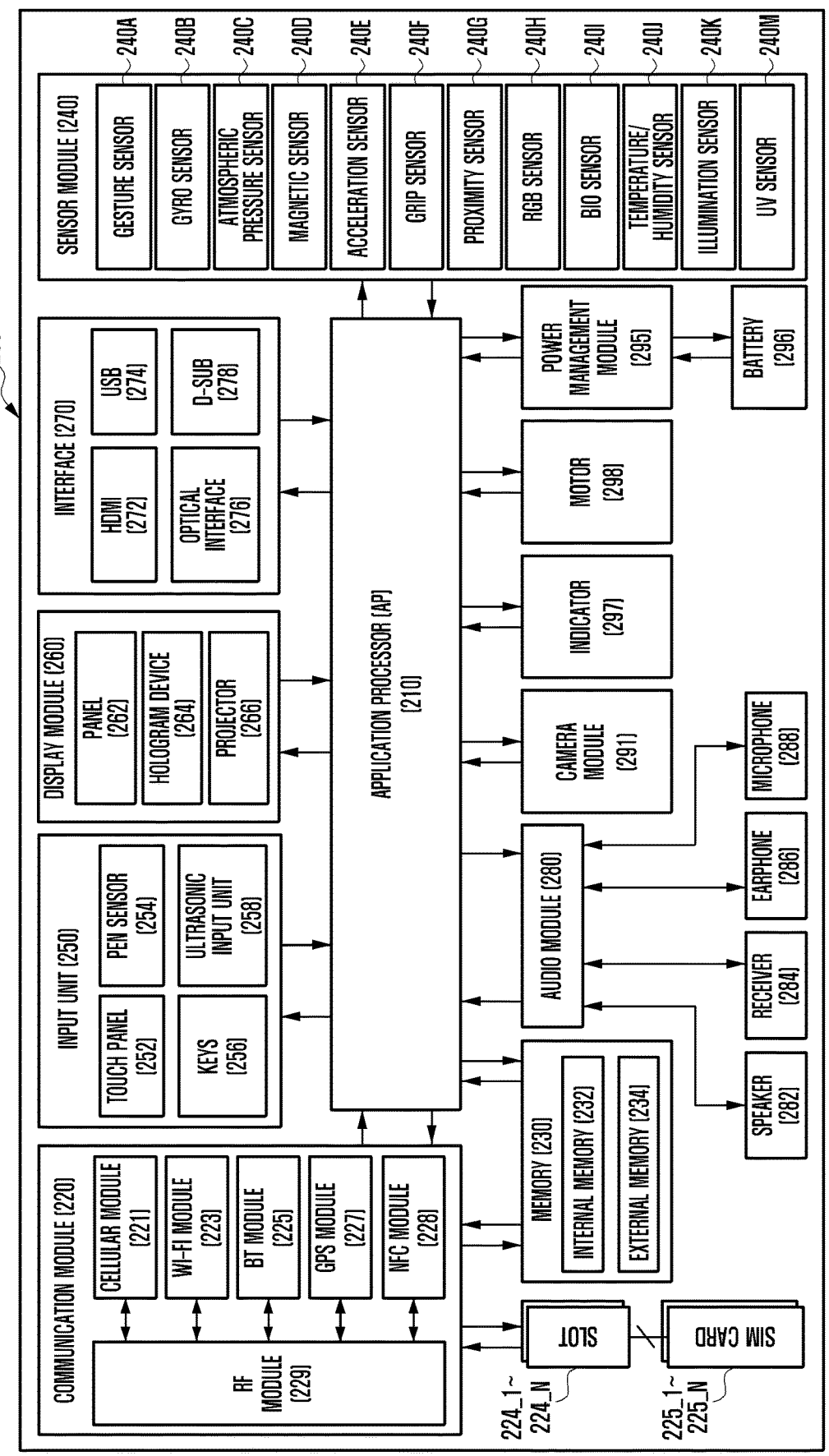
FIG. 2 is a block diagram illustrating an electronic device in accordance with an embodiment of the present invention.

FIG. 2 is a block diagram illustrating an electronic device 201 in accordance with an embodiment of the present disclosure. The electronic device 201 may form, for example, the whole or part of the electronic device 100 shown in FIG. 1. Referring to FIG. 2, the electronic device 201 includes at least one application processor (AP) 210, a communication module 220, a subscriber identification module (SIM) card 225, a memory 230, a sensor module 240, an input unit 250, a display module 260, an interface 270, an audio module 280, a camera module 291, a power management module 295, a battery 296, an indicator 297, and a motor 298.

The AP 210 drives an operating system or applications, controls a plurality of hardware or software components connected thereto, and also performs processing and operation for various data including multimedia data. The AP 210 may be formed of a system-on-chip (SoC), for example. According to an embodiment of the present invention, the AP 210 may further include a graphic processing unit (GPU).

The communication module 220 (e.g., the communication interface 160) performs a data communication with any other electronic device (e.g., the electronic device 104 or the server 106) connected to the electronic device 200 (e.g., the electronic device 100) through the network. According to an embodiment of the present invention, the communication module 220 includes therein a cellular module 221, a WiFi module 223, a BT module 225, a GPS module 227, an NFC module 228, and an RF (Radio Frequency) module 229.

The cellular module 221 provides a voice call, a video call, a message service, an internet service, or the like through a communication network (e.g., LTE, LTE-A, CDMA, WCDMA, UMTS, WiBro, or GSM, etc.). Additionally, the cellular module 221 performs identification and authentication of the electronic device in the communication network, using the SIM card 225. According to an embodiment of the present invention, the cellular module 221 performs at least part of functions the AP 210 can provide. For example, the cellular module 221 may perform at least part of a multimedia control function.

According to an embodiment of the present invention, the cellular module 221 may include a communication processor (CP). Additionally, the cellular module 221 may be formed of an SoC, for example. Although some elements such as the cellular module 221 (e.g., the CP), the memory 230, or the power management module 295 are shown as elements separate from the AP 210 in FIG. 2, the AP 210 may be formed to have at least part of the above elements.

The AP 210 or the cellular module 221 (e.g., the CP) load commands or data, received from a nonvolatile memory connected thereto or from at least one of the other elements, into a volatile memory to process them. Additionally, the AP 210 or the cellular module 221 stores data, received from or created at one or more of the other elements, in the nonvolatile memory.

Each of the WiFi module 223, the BT module 225, the GPS module 227 and the NFC module 228 includes a processor for processing data transmitted or received therethrough. Although FIG. 2 shows the cellular module 221, the WiFi module 223, the BT module 225, the GPS module 227 and the NFC module 228 as separate blocks, at least some of them may be contained in a single IC (Integrated Circuit) chip or a single IC package. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 transmits and receives data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module.

The SIM cards 225_1 to 225_N may be a specific card of the SIM and are insertable into slots 224_1 to 224_N formed at a certain location on the electronic device. The SIM cards 225_1 to 225_N may contain therein an ICCID (Integrated Circuit Card IDentifier) or an IMSI (International Mobile Subscriber Identity).

The memory 230 (e.g., the memory 130) includes an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment of the present invention, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment of the present invention, the electronic device 200 may further include a storage device or medium such as a hard drive.

The sensor module 240 measures physical quantity or senses an operating status of the electronic device 200, and then converts measured or sensed information into electric signals. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor, an EMG (electromyography) sensor, an EEG (electroencephalogram) sensor, an ECG (electrocardiogram) sensor, an IR (infrared) sensor, an iris scan sensor (not shown), or a finger scan sensor. Also, the sensor module 240 may include a control circuit for controlling one or more sensors equipped therein.

The input unit 250 includes a touch panel 252, a digital pen sensor 254, at least one key 256, and an ultrasonic input unit 258. The touch panel 252 recognizes a touch input in a capacitive type, resistive type, infrared type, or ultrasonic type. Also, the touch panel 252 may further include a control circuit. In the case of a capacitive type touch input, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment of the present invention, the electronic device 200 receives a user input from any external device (e.g., a computer or a server) connected thereto through the communication module 220.

The display 260 (e.g., the display 150) includes a panel 262, a hologram device 264, or a projector 266. The panel 262 may be, for example, an LCD (Liquid Crystal Display), an AM-OLED (Active Matrix Organic Light Emitting Diode), or the like. The panel 262 may be a flexible, transparent or wearable. The panel 262 may be formed of a single module with the touch panel 252. The hologram 264 shows a stereoscopic image in the air using interference of light. The projector 266 projects an image onto a screen, which may be located inside or outside of the electronic device 200. According to an embodiment of the present invention, the display 260 may further include a control circuit for controlling the panel 262, the hologram device 264, and the projector 266.

The interface 270 includes, for example, an HDMI (High-Definition Multimedia Interface) 272, a USB (Universal Serial Bus) 274, an optical interface 276, and a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 performs a conversion between sounds and electric signals. At least part of the audio module 280 may be contained, for example, in the input/output interface 140 shown in FIG. 1. The audio module 280 processes sound information input or output through a speaker 282, a receiver 284, an earphone 286, or a microphone 288.

The camera module 291 is a device capable of obtaining still images and moving images. The camera module 291 may include at least one image sensor (e.g., a front sensor or a rear sensor), a lens, an ISP (Image Signal Processor), or a flash (e.g., LED or xenon lamp).

The power management module 295 manages electric power of the electronic device 200. Although not shown, the power management module 295 may include, for example, a PMIC (Power Management Integrated Circuit), a charger IC, or a battery gauge.

The PMIC may be formed, for example, of an IC chip or SoC. Charging may be performed in a wired or wireless manner. The charger IC charges a battery 296 and prevents overvoltage or overcurrent from a charger. According to an embodiment of the present invention, the charger IC may be used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge measures the residual amount of the battery capacity 296 and a voltage, current or temperature during a charging process. The battery 296 stores or creates electric power therein and supplies electric power to the electronic device 200. The battery 296 may be, for example, a rechargeable battery or a solar battery.

The indicator 297 shows thereon a current status (e.g., a booting status, a message status, or a recharging status) of the electronic device 200 or of its part (e.g., the AP 210). The motor 298 converts an electrical signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with terms such as unit, logic, logical block, component, or circuit, for example. The module may be the minimum unit, or part thereof, which performs one or more particular functions. The module may be formed mechanically or electronically. For example, the module disclosed herein may include at least one of an ASIC (Application-Specific Integrated Circuit) chip, FPGAs (Field-Programmable Gate Arrays), and a programmable-logic device, which are known or are to be developed.

Figure 3:
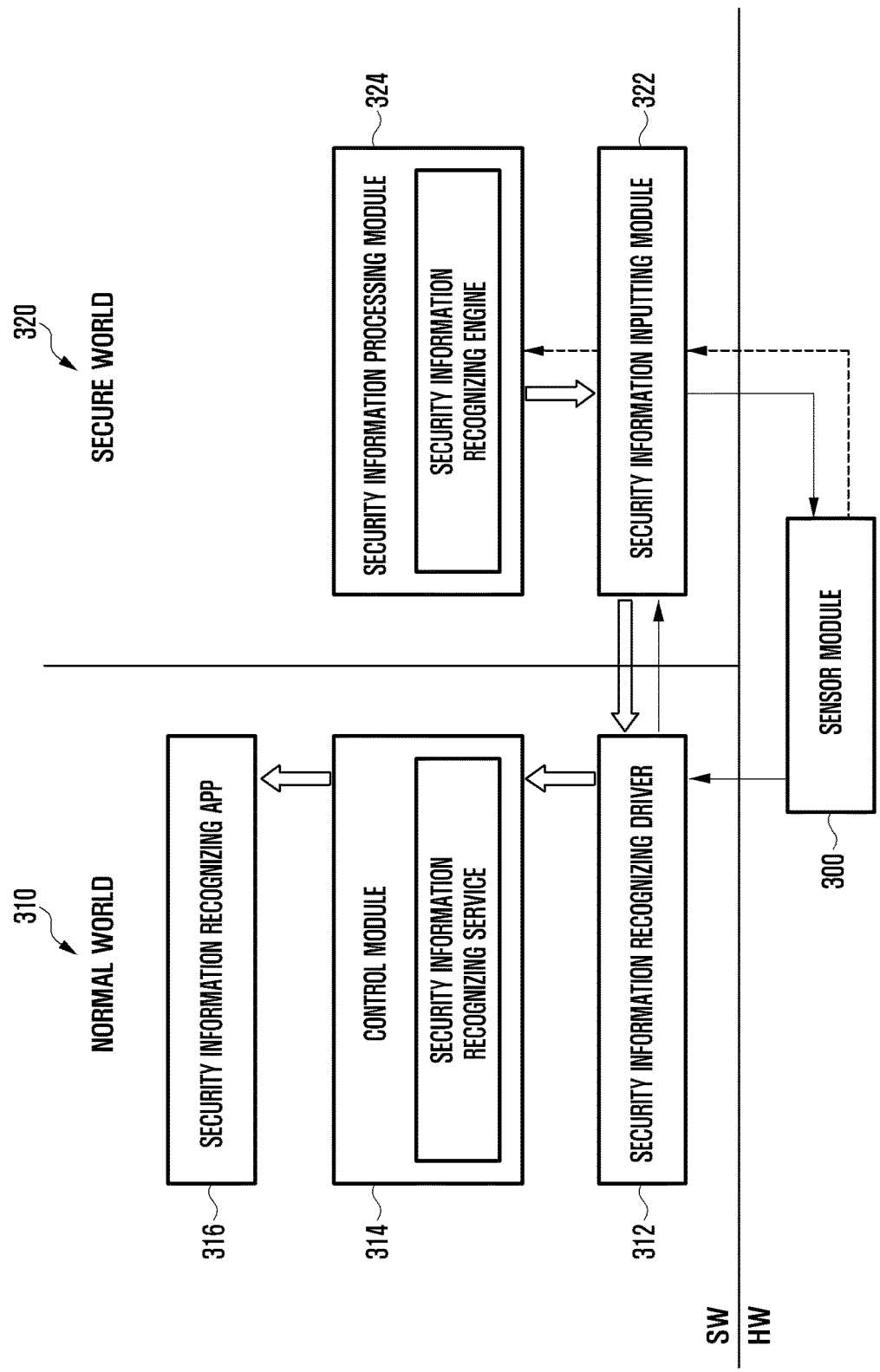
FIG. 3 illustrates a schematic block diagram that describes a method for reading security information in secure world and transferring it to a security information processing module in the secure world in an electronic device according to an embodiment of the present invention.

FIG. 3 illustrates a schematic block diagram that describes a method for reading security information in secure world and transferring it to a security information processing module in the secure world in an electronic device according to an embodiment of the present invention.

Referring to FIGS. 2 and 3, the electronic device 200 includes a sensor module 240, 300. The sensor module 240, 300 senses a user's biometric information. The sensor module 300 may be a fingerprint sensor, iris sensor, vein sensor, voice sensor, and facial sensor. Examples of the user's biometric information include information about a user's fingerprint, iris, vein patterns, voice, face, etc.

The electronic device 200 includes a normal world 310 and a secure world 320. The normal world 310 refers to a space where an operating system (OS), e.g., Linux, Android, iOS, etc., operates, and frameworks and applications are also operated under the control of the OS. Since it is difficult to restrict the actions of malicious software in the normal world 310, there is always a risk when performing operations requiring a high level of security in the normal world 310.

Since the secure world 320 restricts operations of the existing (OS) and frameworks and is separated from the normal world 310, it can prevent security-related problems caused by malicious software from occurring. The secure world 320 may allow for use of a System on Chip (SoC) and a variety of hardware resources.

The sensor module 300 recognizes a user's motion for inputting his/her security information. To this end, the electronic device 200 performs a preliminary operation to recognize a user's motion for inputting his/her security information. For example, when a user inputs a key or touch signal, inputs a voice instruction, or makes a gesture to the sensor module, the electronic device 200 may switch a current screen to a screen for receiving a user's security information.

The sensor module 300 recognizes a user's motion for inputting his/her security information and creates an interrupt. For example, when a user's finger contacts a fingerprint sensor of the sensor module 300, the fingerprint sensor recognizes the contact and creates the corresponding interrupt. When a user's eyes approach an iris sensor of the sensor module 300, the iris sensor recognizes the iris and creates the corresponding interrupt. When a user's hand approaches a vein sensor of the sensor module 300, the vein sensor recognizes vein patterns and creates the corresponding interrupt. When a user inputs a signal for inputting a voice to a voice sensor of the sensor module 300, the voice sensor creates the corresponding interrupt. When a user's face approaches a facial sensor of the sensor module 300, the facial sensor recognizes the facial outline including eyes, nose, mouth, etc. and creates the corresponding interrupt.

It should be understood that the present invention is not limited to these embodiments.

The sensor module 300 transfers the created interrupt to a security information recognizing driver 312 in the normal world 310.

The security information recognizing driver 312 transfers the interrupt to a security information inputting module 322 in the secure world 320.

The security information inputting module 322 reads raw data related to a user's security information from the sensor module 300, in response to the received interrupt. Since the security information inputting module 322 is located in the secure world 320, it protects the raw data against malicious hacking tools from the time point when the user's security information is input.

The security information inputting module 322 transfers the raw data to a security information processing module 324 in the secure world 320. The raw data may be used to create a template for security information and to perform encryption. The raw data may be used to identify the user, based on the input security information, via a security information recognizing service of a control module 314. The security information recognizing service is provided to a security information recognizing app 316.

In order to read the raw data related to a user's security information by using the security information inputting module 322, although the above embodiment is implemented in such a way that a user's security information is read from the sensor module 300 by transferring an interrupt to the security information inputting module 322 in the secure world 320 via the security information recognizing driver 312 in the normal world 310, i.e., an indirect interrupt transferring, it may be modified in such a way that the user's security information is read from the sensor module 300 by directly transferring an interrupt to the security information inputting module 322 in the secure world 320, i.e., a direct interrupt transferring.

In an embodiment of the present invention, the electronic device 200 may include a separate input system (e.g., input unit 250), not a sensor module. In that case, the electronic device 200 receives a user's security information by the separate input system, e.g., a signature inputting system for receiving signatures, such as a user's signature. Information about a user's input signature may be included in a user's security information.

The input unit 250 recognizes a user's motion for inputting his/her security information. The electronic device 200 performs a preliminary operation to recognize a user's motion for inputting his/her security information. For example, when a user inputs a key or touch signal, inputs a voice instruction, or makes a gesture to the input unit 250, the electronic device 200 may switch a currently displayed screen to a screen for receiving a user's security information.

When the input unit 250 recognizes a user's motion for inputting his/her security information, it creates an interrupt. For example, when the input unit 250 recognizes a user's motion that applies his/her signature to the touch panel 252, it creates the corresponding interrupt. It should be understood that these embodiments do not limit the invention.

The input unit 250 transfers the created interrupt to the security information recognizing driver 312 in the normal world 310.

The security information recognizing driver 312 transfers the received interrupt to the security information inputting module 322 in the secure world 320.

The security information inputting module 322 reads the raw data related to a user's security information from the input unit 250, in response to the received interrupt. Since the security information inputting module 322 is located in the secure world 320, it protects the raw data against malicious hacking tools from the time point when the user's security information is input.

In order to read the raw data related to a user's security information by using the security information inputting module 322, although the above embodiment is implemented in such a way that a user's security information is read from the input unit 250 by transferring an interrupt to the security information inputting module 322 in the secure world 320 via the security information recognizing driver 312 in the normal world 310, i.e., an indirect interrupt transferring, it may be modified in such a way that the user's security information is read from the input unit 250 by directly transferring an interrupt to the security information inputting module 322 in the secure world 320, i.e., a direct interrupt transferring.

In an embodiment of the present invention, the electronic device 200 outputs a user's security information by an output system (e.g., a display module, an audio module, etc.). In particular, the electronic device may further include an additional buffer in the secure world, thereby preventing the security information to be output from being disclosed.

Figure 4:
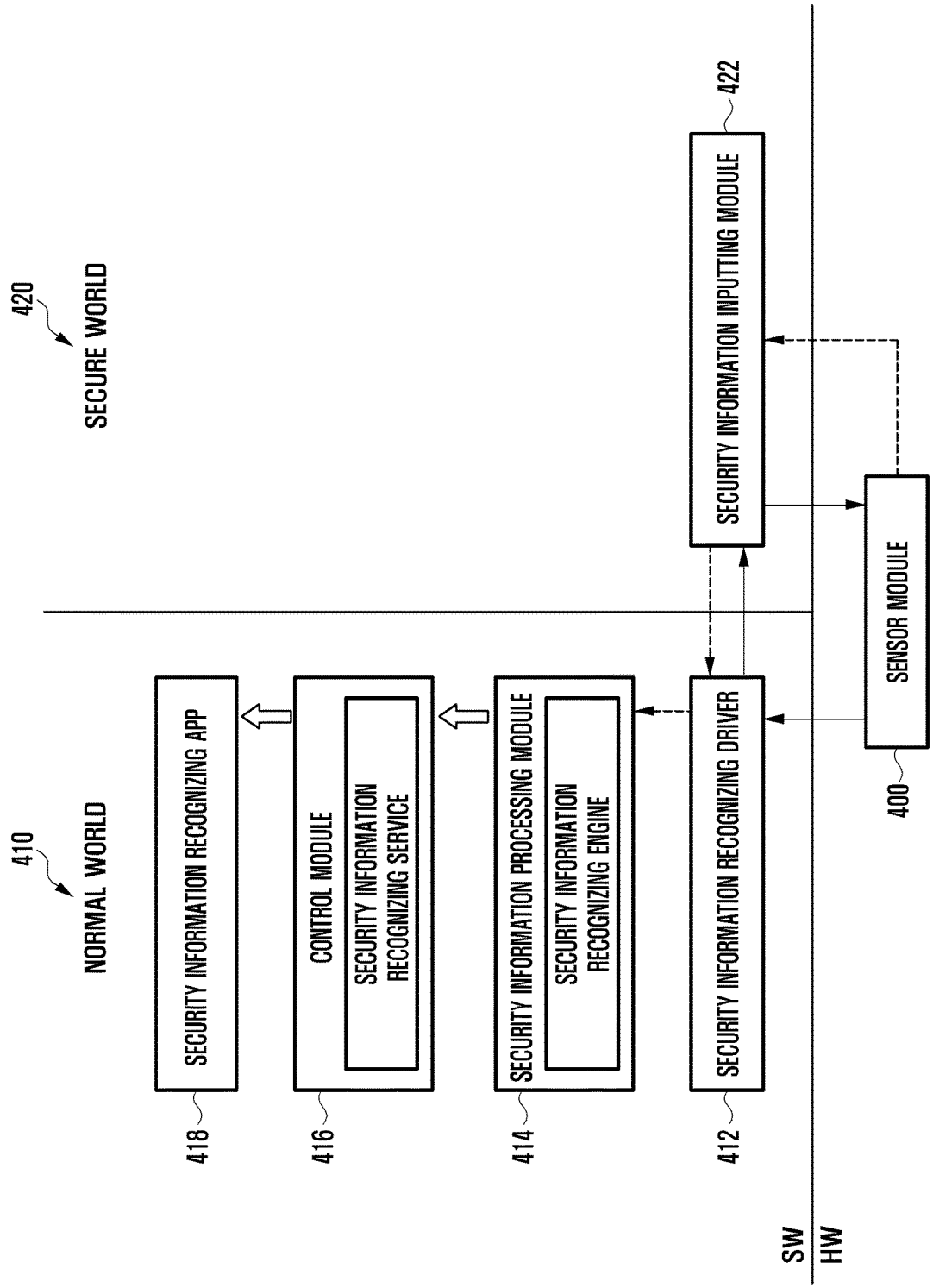
FIG. 4 illustrates a schematic block diagram that describes a method for reading security information in secure world and transferring it to a security information processing module in normal world in an electronic device according to an embodiment of the present invention.

FIG. 4 illustrates a schematic block diagram that describes a method for reading security information in secure world and transferring it to a security information recognizing engine of a security information processing module in normal world in an electronic device according to an embodiment of the present invention.

Referring to FIGS. 2 and 4, the electronic device 200 includes a sensor module 240. The sensor module 240 senses a user's biometric information.

Similar to the electronic device described above with regards to FIG. 3, the electronic device 200 includes a normal world 410 and a secure world 420. Since the secure world 420 restricts operations of the existing operation system and frameworks and is separated from the normal world 410, it can prevent security-related problems caused by malicious software from occurring. The secure world 420 allows for use of a System on Chip (SoC) and a variety of hardware resources.

The sensor module 400 recognizes a user's motion for inputting his/her security information and creates an interrupt, as described above. The sensor module 400 transfers the created interrupt to a security information recognizing driver 412 in the normal world 410. The security information recognizing driver 412 transfers the interrupt to a security information inputting module 422 in the secure world 420. The security information inputting module 422 reads raw data related to a user's security information from the sensor module 400, in response to the received interrupt. Since the security information inputting module 422 is located in the secure world 420, it protects the raw data against malicious hacking tools from the time point when the user's security information is input.

The security information inputting module 422 transfers the raw data to a security information processing module 414 in the normal world 410. The raw data is used to create a template for security information and to perform encryption. The raw data is used to identify the user, based on the input security information, via a security information recognizing service of a control module 416. In order to read the raw data related to a user's security information by using the security information inputting module 422, although the above embodiment is implemented in such a way that a user's security information is read from the sensor module 400 by transferring an interrupt to the security information inputting module 422 in the secure world 420 via the security information recognizing driver 412 in the normal world 410, i.e., an indirect interrupt transferring, it may be modified in such a way that the user's security information is read from the sensor module 400 by directly transferring an interrupt to the security information inputting module 422 in the secure world 420, i.e., a direct interrupt transferring.

In an embodiment of the present invention, the electronic device 200 may include a separate input system (e.g., input unit 250), and not a sensor module, as described above.

When the input unit 250 recognizes a user's motion for inputting his/her security information, it creates an interrupt. For example, when the input system 250 recognizes a user's motion that applies his/her signature to the touch panel 252, it creates the corresponding interrupt. It should be understood that the embodiments do not limit the invention.

The input unit 250 transfers the created interrupt to the security information recognizing driver 412 in the normal world 410. The security information recognizing driver 412 transfers the received interrupt to the security information inputting module 422 in the secure world 420. The security information inputting module 422 reads the raw data related to a user's security information from the input unit 250, in response to the received interrupt. Since the security information inputting module 422 is located in the secure world 420, it protects the raw data against malicious hacking tools from the time point when the user's security information is input.

In order to read the raw data related to a user's security information by using the security information inputting module 422, although the above embodiment is implemented in such a way that a user's security information is read from the input unit 250 by transferring an interrupt to the security information inputting module 422 in the secure world 420 via the security information recognizing driver 412 in the normal world 410, i.e., an indirect interrupt transferring, it may be modified in such a way that the user's security information is read from the input unit 250 by directly transferring an interrupt to the security information inputting module 422 in the secure world 420, i.e., a direct interrupt transferring.

In an embodiment of the present invention, the electronic device 200 may output a user's security information by an output system (e.g., a display module, an audio module, etc.). In particular, the electronic device may further include an additional buffer in the secure world, thereby preventing the security information to be output from being disclosed.

Figure 5:
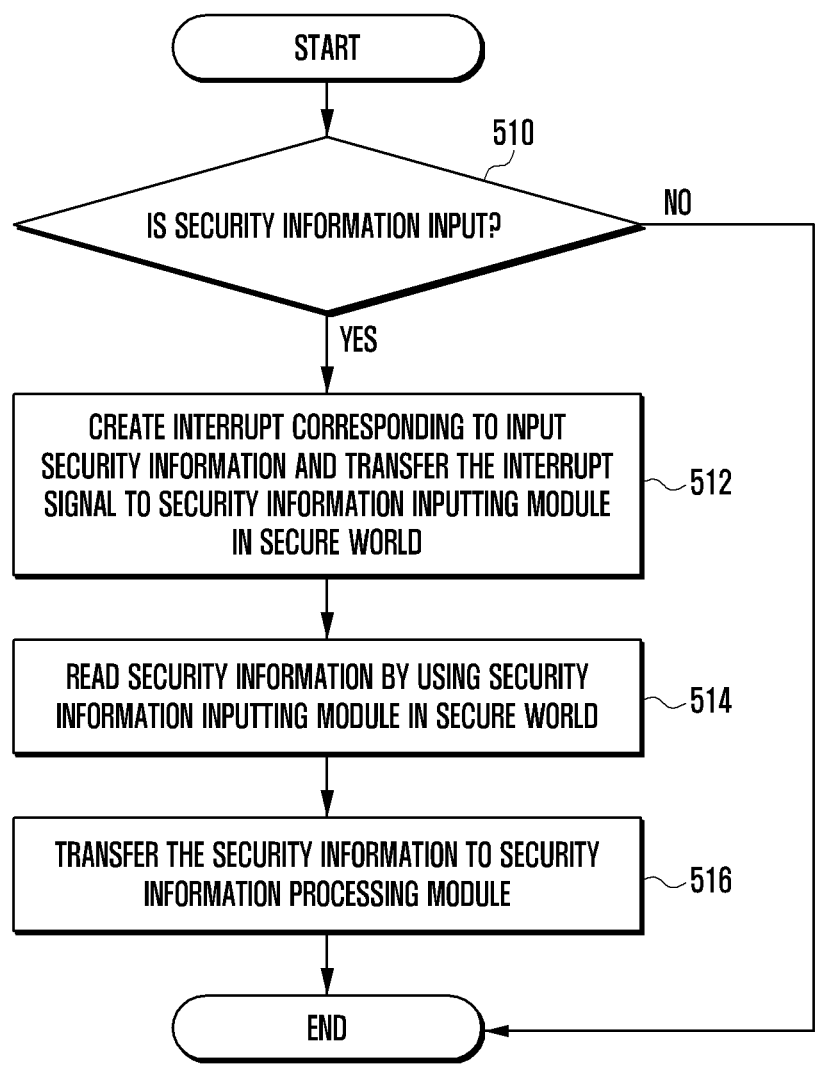
FIG. 5 illustrates a flow chart of a method for reading security information and transferring it to a security information processing module in an electronic device according to an embodiment of the present invention.

FIG. 5 illustrates a flow chart of a method for reading security information and transferring it to a security information processing module in an electronic device according to an embodiment of the present invention.

The electronic device 200 recognizes a user's motion for inputting his/her security information via a sensor module in step 510. The electronic device 200 may recognize a user's motion for inputting his/her security information by using a separated input system (e.g., input unit 250) at step 510. For example, the electronic device 200 may recognize a user's motion for inputting his/her signature by using input unit 250. As described above, the electronic device 200 may perform a preliminary operation to recognize a user's motion for inputting his/her security information. For example, when a user inputs a key or touch signal, inputs a voice instruction, or makes a gesture to the input system 250, the electronic device 200 may switch a current screen to a screen for receiving a user's security information. When the electronic device 200 senses a user's motion for inputting his/her security information at step 510, it creates an interrupt corresponding to a motion for inputting security information and transfers it to a security information inputting module in the secure world in step 512. The interrupt may be transferred to a security information inputting module in the secure world in an indirect manner or in a direct manner. That is, in an indirect manner, the interrupt is transferred to a security information inputting module in the secure world by using a security information recognizing driver in the normal world. In a direct manner, the interrupt is directly transferred to a security information inputting module in the secure world without using a security information recognizing driver in the normal world.

The electronic device 200 reads raw data about a user's security information by the security information inputting module in the secure world, in response to the interrupt transferred to the normal world or secure world in step 514. Since the security information inputting module is located in the secure world, it protects the raw data against malicious hacking tools from the time point when the user's security information is input.

The electronic device 200 transfers the raw data about the security information to the security information processing module in step 516. The security information processing module may be located in a normal world or in a secure world with the security information inputting module.

The raw data about the security information may be used to create a template for security information and to perform encryption. The raw data may be used to identify the user, based on the input security information, via a security information recognizing service of a control module.

Figure 6:
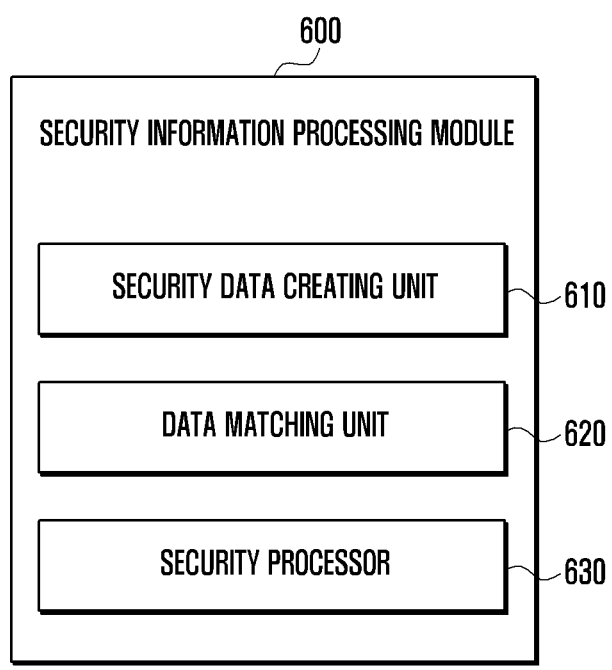
FIG. 6 illustrates a schematic block diagram of a security information processing module in an electronic device according to an embodiment of the present invention.

FIG. 6 illustrates a schematic block diagram of a security information processing module in an electronic device according to an embodiment of the present invention.

Referring to FIG. 6, the security information processing module 600, located in a secure world, includes a security data creating unit 610, a data matching unit 620, and a security processor 630. The security data creating unit 610 calculates inherent characteristics about a recognized object, based on the raw data about the security information obtained by the sensor module.

The security data creating unit 610 transforms the calculated inherent characteristics to a security template and creates the security data. The template is created by encrypting the security image information obtained by the sensor module.

In an embodiment of the present invention, the security data creating unit 610 obtains a security image (e.g., fingerprint image, iris pattern image, face image, etc.) from the sensed data. For example, the security image may be obtained in an optical manner using the principle of light reflection or in a non-optical manner by using pressure, heat, ultrasonic waves, etc. The security data creating unit 610 extracts individuals' inherent characteristics, based on security images. For example, when fingerprints are recognized, the characteristics for fingerprint recognition may be minutiae, such as ridge end, bifurcation point, core point, or delta point, etc. In order to evaluate how much the characteristics match the registered security data, the characteristics may be calculated in a preset format (or frame). For example, the preset format of characteristics may be in the form of a template.

When detecting a request for registering security information, the security data creating unit 610 stores the created security data as registration information in the memory. The registration of security information may be requested by a secure signal transferred from the normal world.

When detecting a security authentication request, the data matching unit 620 determines whether the security authentication data, input for authentication, matches registered security data. The security authentication may be requested by a secure signal transferred from the normal world.

In an embodiment of the present invention, the data matching unit 620 compares the characteristic value calculated from the raw data, input for security authentication, with at least one of the values of security registration data, and calculates matching values. The matching values provide information about how much the security authentication data matches the security registration data.

For example, a matching value may be the number of characteristic points matching between the security authentication data and the security registration data during the matching process. A matching value may be calculated by statistics or probability function, considering the distance and direction between characteristic points included in the security data, similarity in the arrangement of characteristic points, or the like. The data matching unit 620 determines whether security authentication is successful based on the matching value of the characteristics. When the data matching unit 620 ascertains that the matching value exceeds a threshold, it concludes that the security authentication is successful. On the contrary, when the data matching unit 620 ascertains that the matching value is less than or equal to a threshold, it concludes that the security authentication has failed.

The data matching unit 620 transfers the result of authentication (e.g., a true-false-type of signal) to the security information recognition service in the normal world.

The security processor 630 encrypts or decrypts security data. The security processor 630 may creates a unique key based on a unique device identifier. For example, the unique key may be a value accessible in a secure mode.

In an embodiment of the present invention, when registering security information, the security processor 630 encrypts security data by using a unique key and stores the encrypted security data in the secure world of the memory. When performing security information authentication, the security processor 630 obtains the encrypted security data from the secure world of the memory, and decrypts it by using a unique key. The security processor 630 transfers the decrypted security data to the data matching unit 620. In such a case, a function to create a unique key may be a value created when the processor is operated as a virtual secure core system. The access to the value is limited when the processor is operated as a normal secure core system.

In an embodiment of the present invention, the security processor 630 encrypts security data by using a unique key, and transfers the encrypted security data to the security information recognition service in the normal world. When performing security authentication, the security processor 630 receives the encrypted security data from the security information recognition service in the normal world and decrypts it by using the unique key created in the secure world. The security processor 630 transfers the decrypted security data to the data matching unit 620.

In an embodiment of the present invention, the security processing unit 630 transforms security data to pseudo-data by a transformation function. The transformation function may include a one way function, a data array function, etc. The transformation function may include a function that uses a value obtainable from a separate secure hardware device or when it operates in a secure mode. The transformation function may store security data as meta-data. The security processor 630 transfers the created pseudo-data to the data matching unit 620 and the security data creating unit 610. For example, the security data creating unit 610 stores the pseudo-data as registration information. The security data matching unit 620 determines whether security authentication is successful by comparing the registered pseudo-data with newly created pseudo-data.

The security processor 630 may variably manage a transformation function for creating pseudo-data. For example, when security authentication information is unintentionally disclosed, the security processor 630 changes the transformation function and creates pseudo-data by the changed transformation function. When security authentication information is disclosed, since the meta-data of the security data is updated, the security processor 630 may update or discard the existing security data.

In embodiments of the present invention, the electronic device, where one processor controls a normal world and a secure world, may include a sensor module for performing security authentication and a processor. The processor detects a security information input event from the sensor module in the normal world. The processor transfers the security information input event from the normal world to the secure world. The processor obtains sensed data from the sensor module in response to the security information input event in the secure world. The processor processes the sensed data obtained in the secure world, and transfers information about a security information registration result and information about a security authentication result to the normal world. In the secure world, the processor calculates characteristics from the sensed data; creates security data based on the characteristics; encrypts the security data by using a unique key created based on a unique identifier; and registers the encrypted security.

The processor transfers the encrypted security data to the normal world and stores the encrypted security data in the normal world.

The processor obtains encrypted registration data from a memory, allocated as a normal world or a secure world; decrypts the encrypted registration data by a unique key created based on a unique identifier; performs security authentication by comparing the decrypted registration data with created security data; concludes that security authentication is successful when a matching value of the data exceeds a preset threshold; and concludes that security authentication has failed when a matching value of the data is less than or equal to the preset threshold.

The processor may transfer the information about a security information registration result and the information about a security authentication result by using a true/false-type signal corresponding to the registration result and the recognition result.

Figure 7:
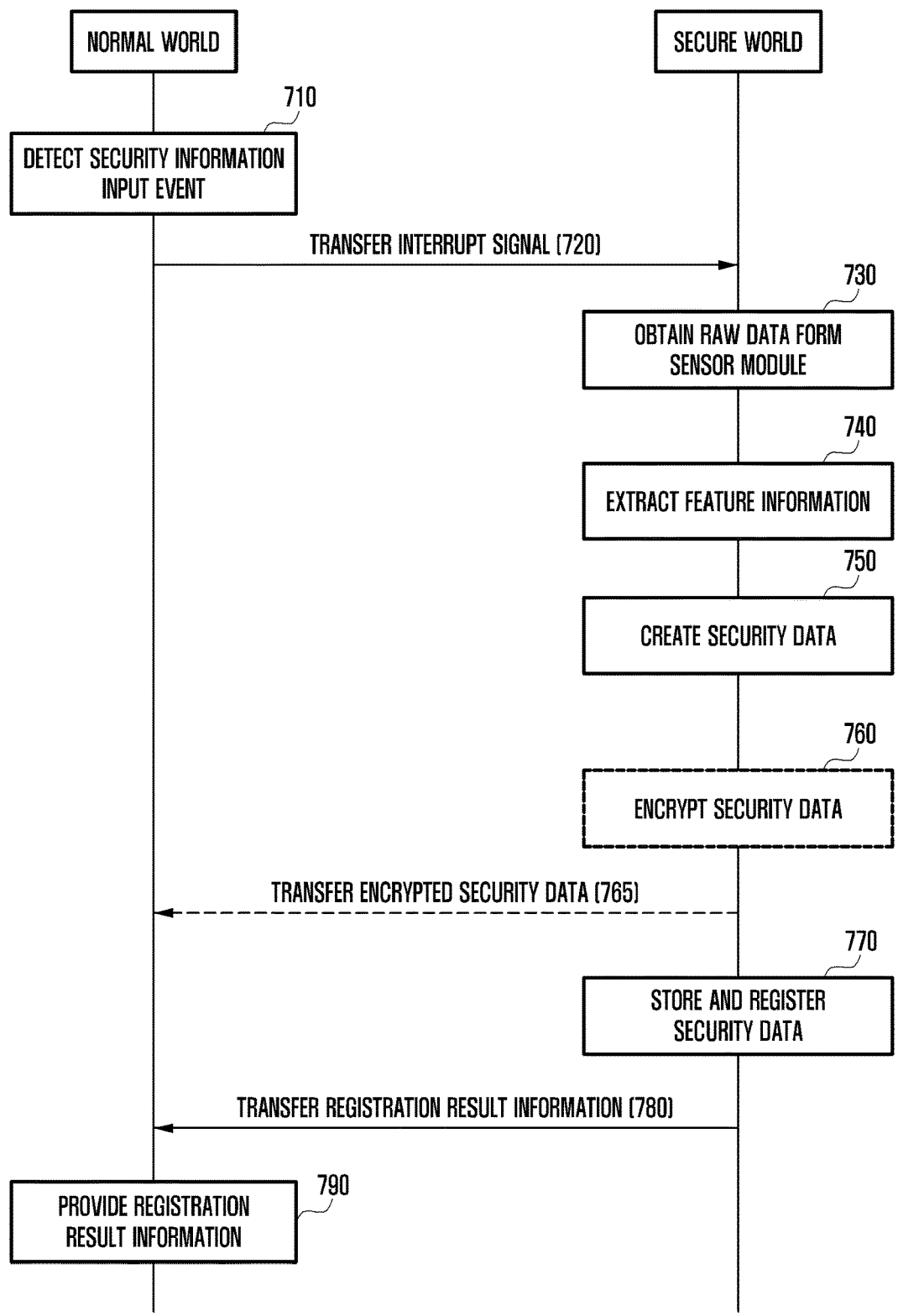
FIG. 7 illustrates a flow chart of a method for registering security information in an electronic device according to an embodiment of the present invention.

FIG. 7 illustrates a flow chart of a method for registering security information in an electronic device according to an embodiment of the present invention.

Referring to FIG. 7, the processor of an electronic device detects a security information input event based on an interrupt signal transferred from the sensor module in a normal world, in order to perform security information registration (e.g., in registration mode) in step 710. When a request for registering security information is made in the normal world, the processor activates the sensor module to detect objects to be recognized. For example, the electronic device with a fingerprint sensor recognizes a user's finger contacting the fingerprint sensor. The electronic device with an iris sensor recognizes a user's eye approaching the iris sensor. The electronic device with a vein sensor recognizes a user's hand approaching the vein sensor. The electronic device with a voice sensor recognizes a user's voice inputting to the voice sensor. The electronic device with a facial sensor recognizes a user's face approaching the facial sensor.

After detecting the security information input event at step 710, the processor transfers an event detection interrupt signal to the secure world to call a virtual secure core system in step 720. The event detection interrupt signal may be a secure interrupt signal.

The processor obtains raw sensed data by the sensor module in the secure world in step 730. The raw sensed data may be raw data of the security information. For example, as previously described, the sensed data may include at least one of fingerprints, lines of the palm, retina patterns, iris patterns, vein patterns, ear shapes, facial outlines, voices, users' writings, etc.

The processor calculates unique characteristics of a recognized object based on the sensed data in the secure world and extracts feature information in step 740. For example, the processor obtains a sensed image from the sensed data and calculates characteristics from the obtained, sensed image. The processor transforms the characteristics to a template form and creates security data in the secure world in step 750. The processor encrypts the security data in the secure world in step 760. For example, the processor creates a unique key based on a unique device identifier in the secure world. The unique key may be a value accessible in secure mode. For example, the processor may store function information for creating a unique key in a memory allocated as a secure world, and may create a unique key by the function information in secure mode. The embodiment of the present invention described in FIG. 7 may be modified without performing step 760; however, it should be understood that the present invention is not limited to such a modification.

The processor transfers the encrypted security data from the secure world to the normal world in step 765. For example, in the normal world, the processor stores the encrypted security data in a memory (e.g., REE (Rich Execution Environment) file system) allocated as a normal world.

In the secure world, the processor stores or registers the security data or the encrypted security data as registration information for security authentication in step 770. In an embodiment of the present invention, the processor may store or register security data in a secure world accessible in secure mode (e.g., TEE (Trusted Execution Environment) file system).

In an embodiment of the present invention, the processor may store a unique key used for encryption or function information for creating a unique key in a secure world accessible in secure mode, and may transfer the encrypted security data to a normal world. The processor may store or register the encrypted security data, transferred from the secure world, in the normal world without access limitation.

Figure 8:
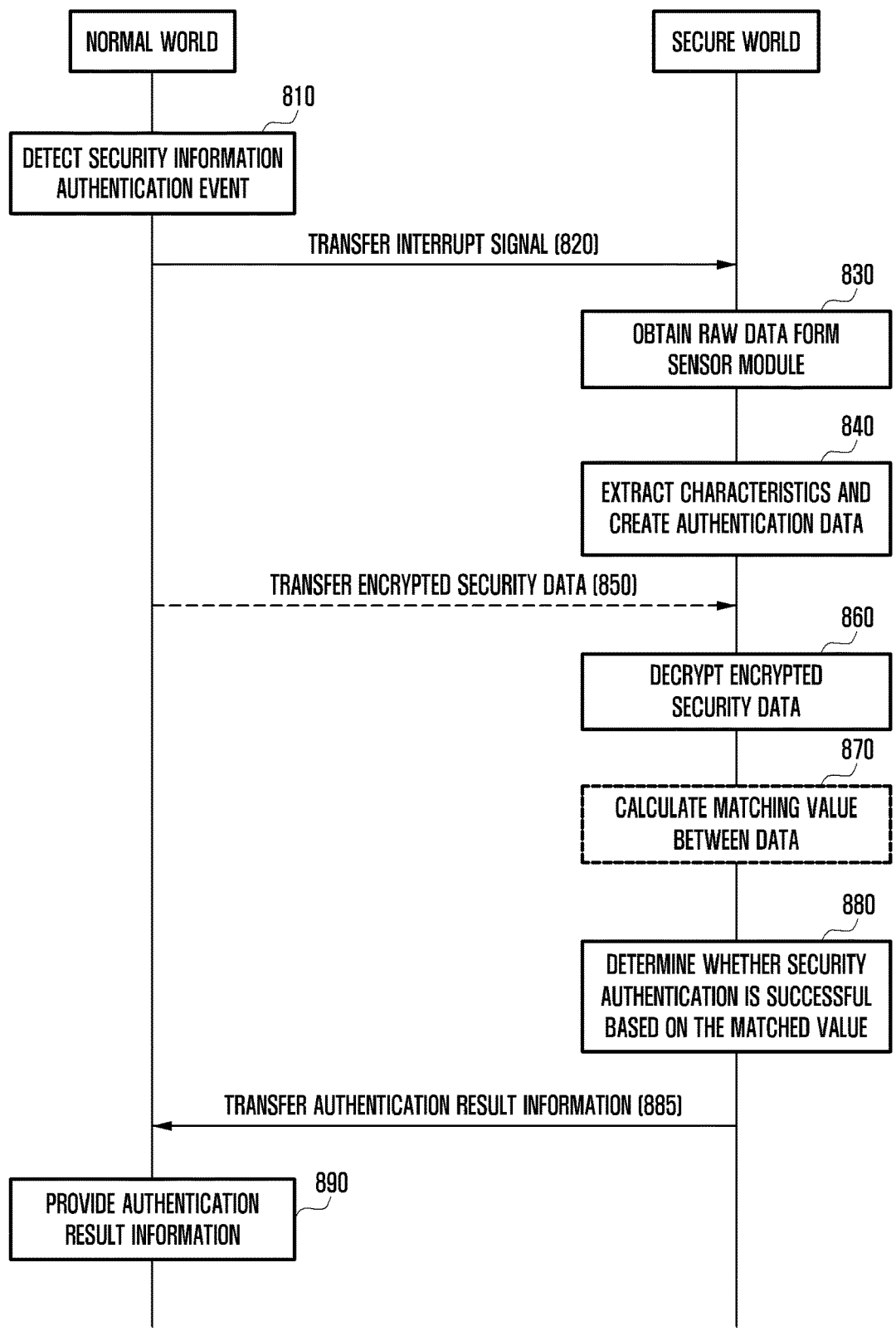
FIG. 8 illustrates a flow chart of a method for authenticating security information in an electronic device according to an embodiment of the present invention.

The processor transfers the security information registration result from the secure world to the normal world in step 780. In the normal world, the processor provides information, indicating that security information has been registered via a virtual normal core, to the user via the user interface or another component of the electronic device in step 790. Meanwhile, when registration of security information has failed because of the deterioration of the quality of raw data, etc., the processor may perform a registration procedure again. To this end, in the normal world, the processor may provide feedback about the registration failure (e.g., visual effects, audio effects, smell effect, tactile effects, etc.) and/or an acquisition of new sensed data to the user interface. FIG. 8 illustrates a flow chart of a method for authenticating security information in an electronic device according to an embodiment of the present invention.

Referring to FIG. 8, the processor of an electronic device detects a security information input event based on an interrupt signal transferred from the sensor module in a normal world, in order to perform security information authentication (e.g., in authentication mode) in step 810. When a request for performing security information authentication is made in the normal world, the processor activates the sensor module to detect a recognized object.

After detecting the security information input event at step 810, the processor transfers an event detection interrupt signal from the normal world to the secure world in step 820. The event detection signal may be a secure interrupt signal.

The processor obtains raw sensed data from the sensor module in the secure world in step 830. In the secure world, the processor calculates and extracts unique characteristics of a recognized object based on the sensed data and creates security authentication data for authenticating security information in step 840. The security authentication data may be in a preset format, e.g., in the form of a template.

In the normal world, the processor receives encrypted security registration data from the normal world or may obtain encrypted security registration data from a memory allocated as a secure world in step 850. In the secure world, the processor decrypts the stored security registration data (e.g., encrypted security data) in step 860. For example, in the secure world, when obtaining encrypted security data, the processor decrypts the encrypted security data by using a unique key. The processor obtains function information for creating a unique key from a memory allocated as a secure world with access limitation, and creates the unique key by using the obtained function information.

In the secure world, the processor calculates a matching value by comparing characteristics calculated from security registration data and security authentication data in step 870. In the secure world, the processor determines whether security authentication is successful based on the matching value of the characteristics in step 880. For example, when the matching value exceeds a preset threshold, the processor concludes that security authentication is successful. On the contrary, when the matching value is less than or equal to the preset threshold, the processor concludes that security authentication has failed.

The processor transfers the security information authentication result from the secure world to the normal world in step 885. In the normal world, the processor provides the security information authentication result to the user via the user interface or another component of the electronic device in step 890. Meanwhile, when authentication of security information has failed because of the deterioration of the quality of raw data, etc., the processor may perform the authentication procedure again. To this end, in the normal world, the processor may provide feedback about the authentication failure (e.g., visual effects, audio effects, tactile effects, smell effects, etc.) and/or an acquisition of new sensed data to the user interface.

As described above, the methods according to the embodiments of the present invention can input and output security information in a secure world of electronic devices, thereby preventing the raw date related to the security information from being disclosed and enhancing the degree of use of the security information (e.g., biometric information). At least part of the method (e.g., operations) or system (e.g., modules or functions) according to the embodiments of the present invention can be implemented with instructions as programming modules that are stored in computer-readable storage media. One or more processors (e.g., processor 210) can execute instructions, thereby performing the functions. An example of the computer-readable storage media is memory 230. At least part of the programming module can be implemented (executed) by processor 210. At least part of the programming module may include modules, programs, routines, sets of instructions or processes, etc., in order to perform one or more functions.

Examples of computer-readable media include magnetic media, such as hard disks, floppy disks, and magnetic tape;

optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present invention may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

Although certain embodiments of the invention have been described in detail above, it should be understood that many variations and modifications of the basic inventive concept herein described, which may be apparent to those skilled in the art, will still fall within the spirit and scope of the embodiments of the invention as defined in the appended claims and their equivalents.

What is claimed is:

1. An electronic device, comprising:
    a fingerprint sensor; and
    a processor configured to:
        detect, in a rich execution environment (REE), a user input to register or authenticate a user's fingerprint in the electronic device using the fingerprint sensor;
        generate, in the REE, a first signal for a security information inputting module in a trusted execution environment (TEE), in response to the user input, the first signal instructing the security information inputting module in the TEE to obtain fingerprint information from the fingerprint sensor;
        transfer the first signal from the REE to the security information inputting module in the TEE;
        obtain the fingerprint information, through the security information inputting module in the TEE, from the fingerprint sensor, in response to the first signal;
        generate, in the TEE, a fingerprint template to be registered as an identifier of the user from the fingerprint information,
        encrypt the fingerprint template in the TEE; and
        transfer the encrypted fingerprint template from the TEE to the REE.

2. The electronic device of claim 1, wherein the processor is further configured to:
    store the encrypted fingerprint template in the TEE.

3. The electronic device of claim 1, wherein the processor is further configured to transfer a second signal indicating a registration result to the REE.

4. The electronic device of claim 3, wherein the processor is further configured to notify the user of the registration result, in response to the second signal.

5. The electronic device of claim 1, wherein the processor, when the user input is to authenticate the user's fingerprint in the electronic device, is further configured to:

compare, in the TEE, the fingerprint template with at least one stored fingerprint template to determine whether or not there is a match.

6. The electronic device of claim 5, wherein the processor is further configured to transfer, to the REE, a second signal indicating an authentication result, based on whether or not there is the match.

7. The electronic device of claim 6, wherein the processor is further configured to notify the user of the authentication result, in response to the second signal.

8. The electronic device of claim 5, wherein the processor is further configured to:
    receive the at least one stored fingerprint template from the REE; and
    decrypt the at least one stored fingerprint template in the TEE, before comparing the fingerprint template with the at least one stored fingerprint template.

9. The electronic device of claim 1, wherein the user input to register or authenticate the user's fingerprint in the electronic device comprises at least one of a key input, a touch input, a voice input, a sensor input, and a gesture input.

10. A method of an electronic device, the method comprising:
    detecting, in a rich execution environment (REE), a user input to register or authenticate a user's fingerprint in the electronic device using a fingerprint sensor;
    generating, in the REE, a first signal for a security information inputting module in a trusted execution environment (TEE), in response to the user input, the first signal instructing the security information inputting module in the TEE to obtain fingerprint information from the fingerprint sensor;
    transferring the first signal from the REE to the security information inputting module in the TEE;
    obtaining the fingerprint information, through the security information inputting module in the TEE, from the fingerprint sensor, in response to the first signal;
    generating, in the TEE, a fingerprint template to be registered as an identifier of the user from the fingerprint information;
    encrypting the fingerprint template in the TEE; and
    transferring the encrypted fingerprint template from the TEE to the REE.

11. The method of claim 10, further comprising:
    storing the encrypted fingerprint template in the TEE.

12. The method of claim 10, further, comprising transferring a second signal indicating a registration result to the REE.

13. The method of claim 12, further comprising notifying the user of the registration result, in response to the second signal.

14. The method of claim 10, further comprising:
    comparing, in the TEE, the fingerprint template with at least one stored fingerprint template to determine whether or not there is a match.

15. The method of claim 14, further comprising transferring, to the REE, a second signal indicating an authentication result, based on whether or not there is the match.

16. A computer-readable, non-transitory recording medium storing a program, which when executed causes a computer to execute a method comprising:
    detecting, in a rich execution environment (REE), a user input to register or authenticate a user's fingerprint in an electronic device using a fingerprint sensor;
    generating, in the REE, a first signal for a security information inputting module in a trusted execution environment (TEE), in response to the user input, the first signal instructing the security information inputting module in the TEE to obtain fingerprint information from the fingerprint sensor;

transferring the first signal from the REE to the security information inputting module in the TEE;

obtaining the fingerprint information, through the security information inputting module in the TEE, from the fingerprint sensor, in response to the first signal;

generating a fingerprint template for registering as an identifier of the user from the fingerprint information in the TEE;

encrypting the fingerprint template in the TEE;

transferring the encrypted fingerprint template from the TEE to the REE.

* * * * *